United States Patent [19]

Takizawa

[11] Patent Number: 5,751,743
[45] Date of Patent: May 12, 1998

[54] INFORMATION TRANSMISSION METHOD AND APPARATUS

[75] Inventor: Hiroshi Takizawa, Yokohama, Japan

[73] Assignee: Canon Kabushiki Kaisha, Tokyo, Japan

[21] Appl. No.: 955,035

[22] Filed: Oct. 1, 1992

[30] Foreign Application Priority Data

Oct. 4, 1991 [JP] Japan .................................. 3-257784

[51] Int. Cl.$^6$ .................................................. H03M 13/00
[52] U.S. Cl. ........................................................ 371/41
[58] Field of Search ................................ 371/5.5, 37.1, 371/41; 358/433, 426; 375/8, 109; 341/67

[56] References Cited

U.S. PATENT DOCUMENTS

| | | | |
|---|---|---|---|
| 3,975,712 | 8/1976 | Hepworth et al. | 371/49.1 |
| 4,914,675 | 4/1990 | Fedele | 341/67 X |
| 4,965,576 | 10/1990 | Watanabe et al. | 341/94 |
| 5,148,271 | 9/1992 | Kato et al. | 348/390 |
| 5,321,398 | 6/1994 | Ikeda | 341/67 |

FOREIGN PATENT DOCUMENTS 0271866 6/1988 European Pat. Off. .

OTHER PUBLICATIONS

Pat. Abs. Jp., vol. 14, No. 354, Jul. 31, 1990 (JP-A-2123831).
Kishimoto et al., "HDTV Transmission System and Coding Method in an ATM Network," signal Processing of HDTV, II. Proceedings 1–6, 10 of the Third Int'l Workshop on HDTV, pp. 561–568 (Aug. 30–Sep. 1, 1989).

*Primary Examiner*—Chuong Dinh Ngo
*Attorney, Agent, or Firm*—Fitzpatrick, Cella, Harper & Scinto

[57] ABSTRACT

In an information transmission method and apparatus, information is transmitted in units of a block including information codes and error-correcting check codes, and the transmission speed is switched by changing the number of blocks to be transmitted per unit time without changing the amount of information of the information codes and the amount of information of the error-correcting check codes within each block.

9 Claims, 3 Drawing Sheets

TOTAL AMOUNT OF INFORMATION N [BIT]

TOTAL AMOUNT OF INFORMATION kN [BIT]

INFORMATION TRANSMISSION METHOD AND APPARATUS

BACKGROUND OF THE INVENTION

1. Field of the Invention

This invention relates to an information transmission method and apparatus, and more particularly, to an information transmission method and apparatus in which the transmission speed of information can be switched.

2. Description of the Related Art

FIG. 4 is a diagram schematically illustrating transmitted information whose amount per unit time T (seconds) (the data rate) equals N (bits).

In FIG. 4, a hatched portion 11 represents check codes for error correction. FIG. 4 illustrates a case in which the redundancy for the total amount of information N (bits) including an information-code portion 12 equals m, and the following amount of check codes per unit time T (seconds) equals mN (bits).

A case will now be considered in which the amount of information to be transmitted per unit time T (seconds) (transmission speed) is changed to kN (bits). FIG. 5 is a diagram schematically illustrating information to be transmitted per unit time in such a case.

If it is assumed that the redundancy m is not changed for the purpose of not changing the error correction capability, the amount of check codes per unit time T (seconds) becomes kmN (bits), as shown in FIG. 5.

In the above-described transmission format, therefore, the amount of check codes per unit time T (seconds) following the information codes is changed if the transmission speed is changed. Hence, it is necessary to change the form of the error-correcting code so as to be suitable for the amount of check codes.

This results in providing different forms of error-correcting codes for different transmission speeds, causing difficulty in circuit design and an increase of the size of the hardware.

The above-described approach also has the problem that even though the redundancy is not changed, the correction capability may change when different error-correcting codes are used in accordance with the form of the error-correcting code.

SUMMARY OF THE INVENTION

The present invention has been made in cosideration of the above-described problems in the prior art.

It is an object of the present invention to provide an information transmission method and an information transmission apparatus in which common hardware can be used for transmission at different speeds while always maintaining a constant error correcting capability.

This object is accomplished, according to one aspect of the present invention, by an information transmission method comprising the steps of transmitting information in units of a block including information codes and error-correcting check codes at one of a plurality of transmission speeds, and switching from one transmission speed to another by changing the number of blocks to be transmitted per unit time without changing the amount of information of the information codes and the amount of information of the error-correcting check codes within each block.

According to another aspect, the present invention relates to an information transmission apparatus comprising means for establishing a first transmission mode for transmitting a first predetermined number of blocks per unit time, each block including a predetermined amount of information codes and a predetermined amount of error-correcting check codes, and means for establishing a second transmission mode for transmitting a second predetermined number, different from the first predetermined number, per unit time of blocks including the predetermined amount of information codes and the predetermined amount of error-correcting check codes.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be explained in detail with reference to the drawings.

Figure 1:
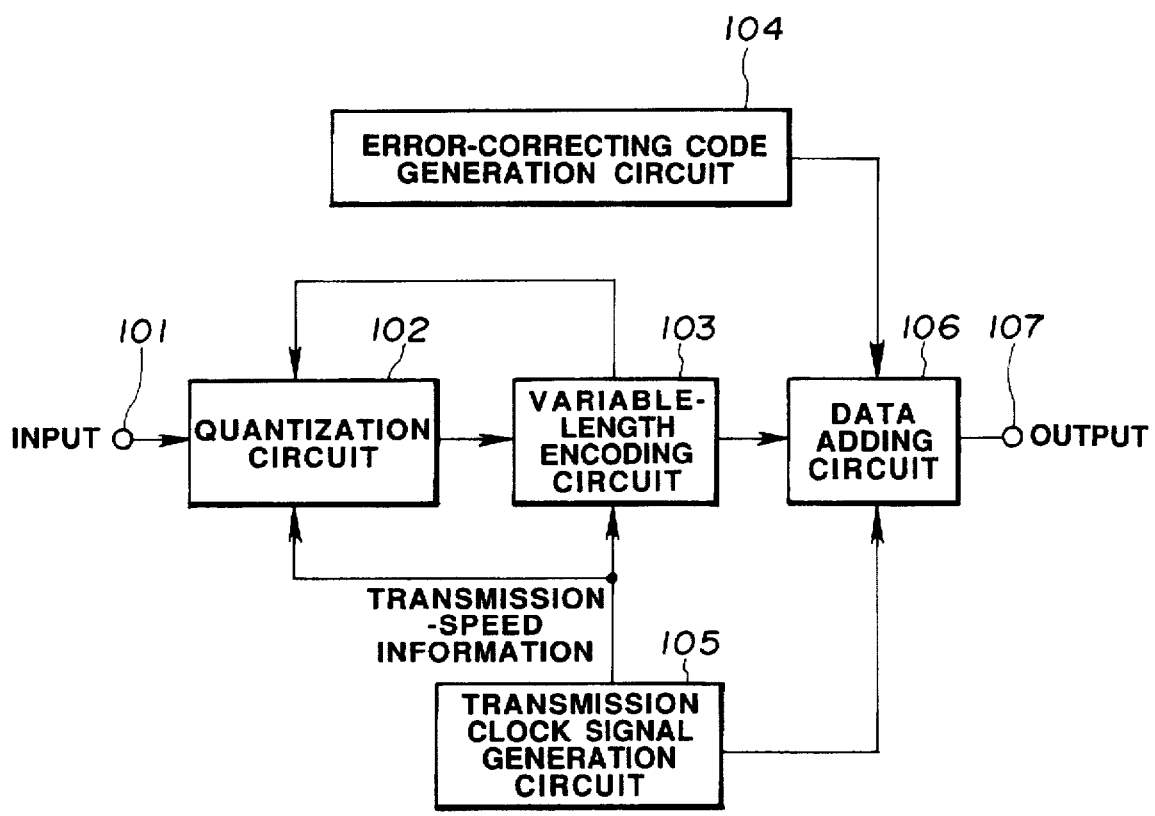
FIG. 1 is a block diagram showing the schematic configuration of an image transmission apparatus according to an embodiment of the present invention.

FIG. 1 is a block diagram showing the schematic configuration of an image transmission apparatus to which the present invention is applied.

In FIG. 1, there is shown an input terminal 101 for image signals. An image signal input from the input terminal 101 is supplied to a quantization circuit 102.

The quantization circuit 102 performs quantization in accordance with a quantization coefficient determined by transmission-speed information input from a transmission clock signal generation circuit 105 and information relating to the amount of encoded data input from a variable-length encoding circuit 103, so that the amount of data which are finally output is constant in units of each picture frame.

The variable-length encoding circuit 103 performs variable-length encoding of information output from the quantization circuit 102 and supplies the encoded information to a data adding or synthesis circuit 106, and also outputs the information to the quantization circuit 102 for determining the quantization coefficient in accordance with the amount of data of the encoded information.

The data synthesis circuit 106 divides the image information subjected to variable-length encoding into respective blocks for every predetermined amount of codes. An error-correcting code generation circuit 104 generates check codes and adds the generated check codes to each of the above-described blocks. Each block to which the check codes are added will be hereinafter termed a small block.

The transmission clock signal generation circuit 105 supplies the data synthesis circuit 106 with a transmission clock signal whose frequency is switched in accordance with the transmission speed.

The data synthesis circuit 106 changes the number of small blocks to be transmitted per unit time so that the desired transmission speed can be obtained in accordance with the transmission clock signal. It is thereby possible to supply a code string at the desired transmission speed to an output terminal 107.

Figure 2:
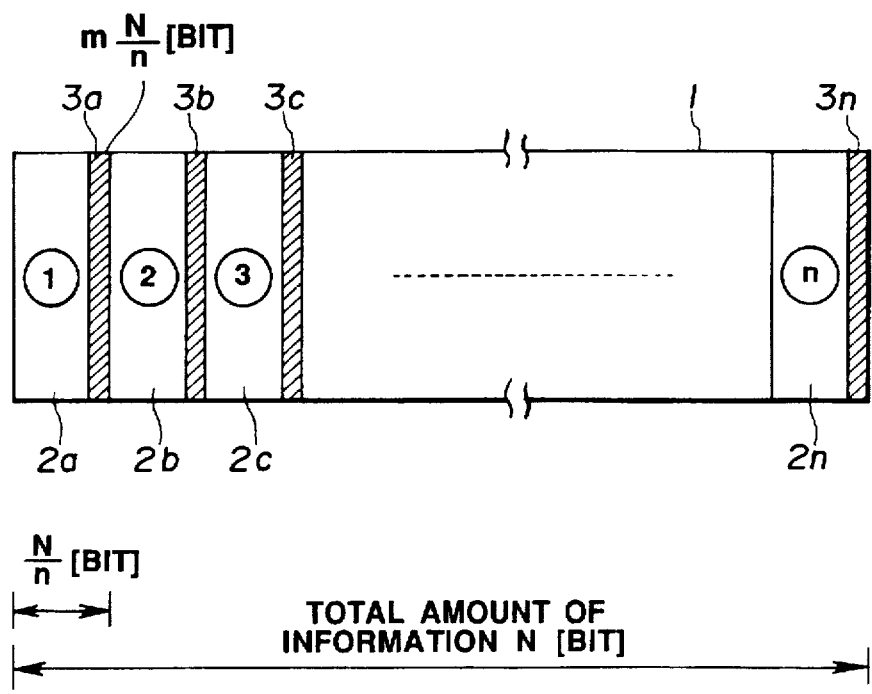
FIG. 2 is a diagram schematically illustrating an information-code string to be transmitted per unit time in a first mode in the image transmission apparatus shown in FIG.1.

FIG. 2 is a diagram schematically illustrating an information-code string to be transmitted in a unit time T (seconds) in a first mode in the image transmission apparatus shown in FIG. 1.

In FIG. 2, reference numeral 1 indicates the total amount N (bits) of codes to be transmitted in the unit time T (seconds). The encoded image information is divided into n portions (2a–2n shown in FIG. 2), one for each small block containing the predetermined amount of information codes. The total amount of codes in each of the divided small blocks equals N/n (bits).

Check codes 3a–3n for error correction whose amount is defined by a predetermined redundancy m are added to the respective small blocks. The amount of check codes in each small block equals mN/n (bits).

Figure 3:
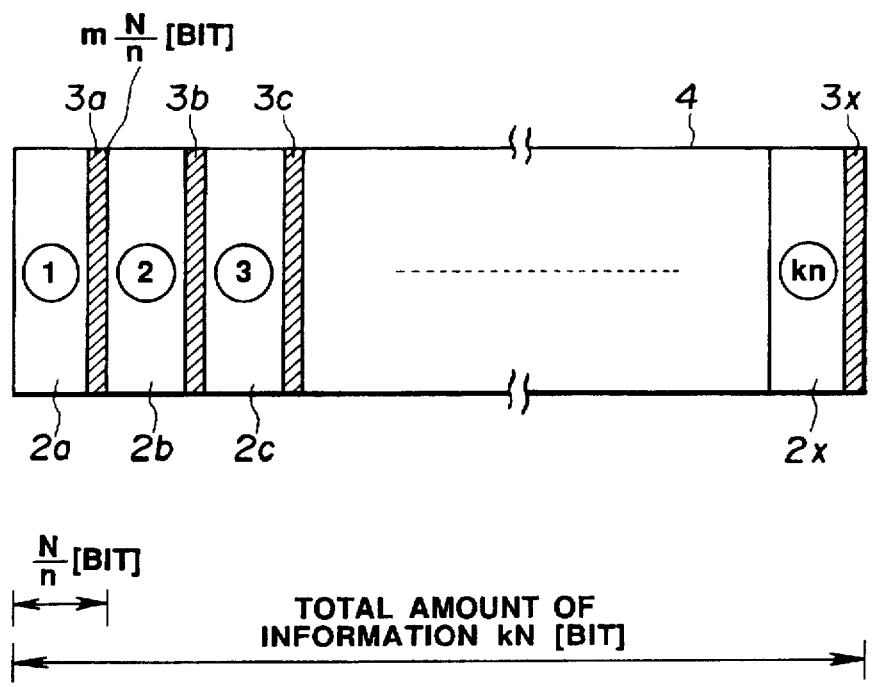
FIG. 3 is a diagram schematically illustrating an information-code string to be transmitted per unit time in a second mode in the image transmission apparatus shown in FIG.1.
Figure 4:
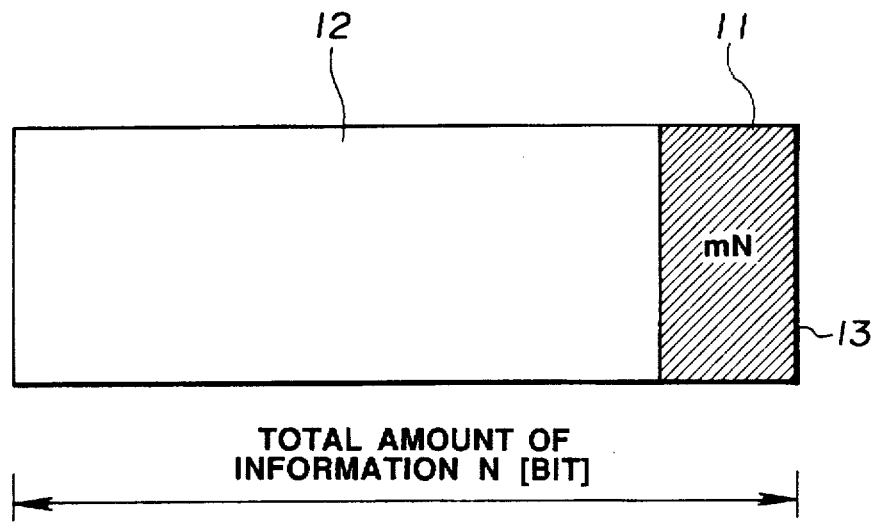
FIG. 4 is a diagram schematically illustrating conventional information to be transmitted per unit time.
Figure 5:
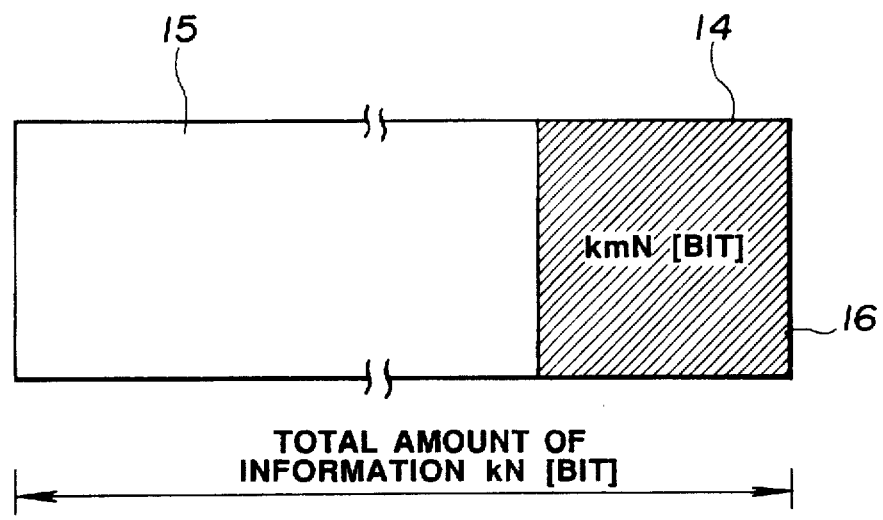
FIG. 5 is schematically illustrating conventional information to be transmitted per unit time at a transmission speed different from that shown in FIG. 4.

FIG. 3 is a diagram schematically illustrating an information-code string to be transmitted per unit time T (seconds) in a second mode in the image transmission apparatus shown in FIG. 1, when the amount of codes to be transmitted per unit time T (seconds) is assumed to be kN (bits).

In FIG. 3, reference numeral 4 indicates the total amount kN (bits) of codes to be transmitted in unit time T (seconds). The encoded image information is divided into x (=nk) portions (2a–2x shown in FIG. 3), one for each small block containing the predetermined amount of information code. Also, the amount of check codes 3a–3n in each small block is mN/n (bits).

Thus, the amount of image information and the amount of information of check codes in each of the x divided small blocks are the same as in the first mode. The total amount of codes in each small block therefore equals N/n (bits).

The desired transmission speed can be obtained by arranging that the value nk be an integer. Accordingly, by making the value n as large as possible, the degree of freedom increases for the value k. Consequently, the value k is not necessarily an integer.

That is, if the number of different transmission speeds which can be used is small, the amount of codes may be determined so that the total amount of codes to be transmitted becomes an integer multiple of the amount of codes in each block.

As is apparent from the foregoing explanation, in the information transmission method and the information transmission apparatus of the present invention, while transmission at different speeds can be performed, the amount of information of information codes and the amount of information of check codes for error correction within a block do not change. Hence, the error correction capability does not have to change in any way even if the transmission speed is changed, and thus the problem in the prior art that the error correction capability changes when the transmission speed is changed is overcome. In addition, the size of the hardware does not increase since exactly the same error processing can be performed for different transmission speeds.

The present invention can be executed in various other forms without departing from the true spirit and scope of the invention.

For example, although in FIGS. 2 and 3 illustrating the above-described embodiment, encoded image information and check codes for error correction are alternately arranged, the object of the present invention may, of course, be achieved no matter how they are arranged in the information transmission string, provided that all information in the information transmission strings 1 and 4 in FIGS. 2 and 3, respectively, can be transmitted in a unit time T (seconds).

In other words, the foregoing description of the embodiment has been given for illustrative purposes only and not to be construed as imposing any limitation in every aspect.

The scope of the invention is, therefore, to be determined by reference to the following claims and is not limited by the text of the specification, and alterations may be made within the true spirit and scope of the invention.

What is claimed is:

1. An image information method for transmitting image information at a plurality of transmission speeds, said method comprising the steps of:

setting a desired transmission speed from the plurality of transmission speeds;

transmitting information in units of a fixed-length block including image information codes and error-correcting check codes for correcting errors of the image information codes, the image information codes being obtained by performing variable-length encoding of image signals in a frame of image data which are encoded to be a predetermined total amount of codes; and changing a number of blocks to be transmitted per unit time without changing a code amount of the image information codes and a code amount of the error correcting check codes within each block in accordance with the set transmission speed.

2. A method according to claim 1, wherein each information code comprises a code obtained by performing variable-length encoding of an image signal for every predetermined number of picture elements.

3. A method according to claim 1, wherein the number of blocks is changed so that a ratio of the number of blocks before the change to the number of blocks after the change is equal to a ratio of a total amount of codes to be transmitted per unit time before the change to a total amount of codes to be transmitted per unit time after the change.

4. An image data transmission apparatus for transmitting image data at a plurality of transmission speeds, said apparatus comprising:

setting means for setting a desired transmission speed from the plurality of transmission speeds;

encoding means for encoding image data so as to provide a predetermined total amount of codes in a frame of the image data;

dividing means for dividing the encoded frame of image data into blocks of image data, each such block having a fixed number of codes of image data;

error-correcting encoding means for forming error-correcting check codes for each block of image data produced by said dividing means;

formation means for forming fixed-length blocks of data, each such block including a block of image data produced by said dividing means and the error-correcting check codes formed for the block of image data by said error-correcting encoding means; and output means for outputting the fixed-length blocks of data formed by said formation means and for changing a number of blocks of data output per unit time in accordance with the transmission speed set by said setting means.

5. An apparatus according to claim 4, wherein said encoding means includes quantization means for quantizing the image signals and variable-length encoding means for encoding the image signals quantized by said quantization means.

6. An image information transmission apparatus for transmitting image information at a plurality of transmission speeds, said apparatus comprising:

setting means for setting a desired transmission speed from the plurality of transmission speeds;

input means for inputting a plurality of blocks of data, each of the blocks of data including a fixed code amount of image information codes and a fixed code amount of error correction check codes, the image information codes being variable-length encoded so that the amount of codes obtained when image data in a frame of image data is encoded is set to be a predetermined total amount of codes; and output means for outputting the block data and for controlling the number of blocks output per unit time in accordance with the transmission speed set by said setting means.

7. An apparatus according to claim 6, wherein each information code comprises a code obtained by performing variable-length encoding of an image signal for every predetermined number of picture elements.

8. An image data transmission apparatus for transmitting image data at variable transmission speeds, said apparatus comprising:

setting means for setting a desired transmission speed from the plurality of transmission speeds;

encoding means for encoding image data so as to provide a predetermined total amount of codes in a frame of the image data;

error-correcting encoding means for forming error-correcting check codes for the encoded image data;

formation means for forming fixed-length block data including the encoded image data and the error-correcting check codes formed by said error-correcting encoding means, each of the fixed-length block data including a fixed code amount of the encoded image data and a fixed code amount of error correction check codes; and output means for outputting the block data formed by said formation means and for controlling the number of blocks output per unit time in accordance with the transmission speed set by said setting means.

9. An apparatus according to claim 8, wherein said encoding means comprises quantization means for quantizing the image signals and variable-length encoding means for encoding the image signals quantized by said quantization means.

* * * * *

UNITED STATES PATENT AND TRADEMARK OFFICE
CERTIFICATE OF CORRECTION

PATENT NO. : 5,751,743

DATED : May 12, 1998

INVENTOR(S): HIROSHI TAKIZAWA

It is certified that error appears in the above-identified patent and that said Letters Patent is hereby corrected as shown below:

COLUMN 4

Line 20, "information method" should read --information transmission method--.

Signed and Sealed this

Tenth Day of August, 1999

Attest:

Q. TODD DICKINSON

*Attesting Officer*  *Acting Commissioner of Patents and Trademarks*